(12) United States Patent
Salamanca

(10) Patent No.: US 8,418,830 B2
(45) Date of Patent: Apr. 16, 2013

(54) ROBOT SYSTEM AND METHOD FOR REMOVING STICKS AND/OR FOREIGN ELEMENTS FROM CONVEYOR BELTS

(75) Inventor: Hugo Salamanca, Santiago (CL)

(73) Assignee: MI Robotic Solutions (MIRS), Providencia, Santiago (CL)

( * ) Notice: Subject to any disclaimer, the term of this patent is extended or adjusted under 35 U.S.C. 154(b) by 1104 days.

(21) Appl. No.: 11/598,119

(22) Filed: Nov. 13, 2006

(65) Prior Publication Data
US 2007/0169230 A1    Jul. 19, 2007

Related U.S. Application Data

(60) Provisional application No. 60/734,974, filed on Nov. 10, 2005.

(51) Int. Cl.
*B23C 1/12*    (2006.01)

(52) U.S. Cl.
USPC ............. 198/358; 901/2; 414/730; 414/738

(58) Field of Classification Search ............. 198/395, 198/750.8; 414/729, 730, 732, 222.01
See application file for complete search history.

(56) References Cited

U.S. PATENT DOCUMENTS

| | | | |
|---|---|---|---|
| 3,575,301 A | 4/1971 | Panissidi | |
| 4,142,639 A | 3/1979 | Ishikawa | |
| 4,166,754 A | 9/1979 | Scheel et al. | |
| 4,412,293 A * | 10/1983 | Kelley et al. | 700/259 |
| 4,602,987 A * | 7/1986 | Bonaventura et al. | 205/633 |
| 4,603,511 A | 8/1986 | Komatsu et al. | |
| 4,608,651 A | 8/1986 | Murakami et al. | |
| 4,672,287 A * | 6/1987 | Fujioka et al. | 318/806 |
| 4,818,174 A | 4/1989 | Arpiarian et al. | |
| 4,907,889 A | 3/1990 | Simone | |
| 4,986,723 A | 1/1991 | Maeda | |
| 5,040,056 A * | 8/1991 | Sager et al. | 348/88 |
| 5,098,644 A | 3/1992 | McDaniels | |

(Continued)

FOREIGN PATENT DOCUMENTS
SU    1637968    3/1991

OTHER PUBLICATIONS

CSIRO, (Internet) QCAT Annual Report—Queensland Center for Advanced Technologies, pp. 1-32, 2003, U.S.A.

(Continued)

*Primary Examiner* — Kavel Singh
(74) *Attorney, Agent, or Firm* — Gottlieb, Rackman & Reisman, PC

(57) ABSTRACT

At present, the removal the sticks from the mineral feeding lines, as a result of the mineral extraction, is carried out manually or using mechanical equipment, which means a loss of efficiency of the grinding and crushing system, high exposure to the risks associated to the removal of foreign elements of grinding material, this method does not guarantee problems from this cause in the subsequent stages in the grinding and crushing process. Due to the above, a robot system and method have been developed for the removal of sticks from the conveyor belts.
The robotic system is composed mainly of an anthropomorphous robotic manipulator of at least 5 degrees of freedom, and a gripping mechanism which is supported by a vision system allowing, in a sequential and programmed way, to remove the sticks. In this regard, most of the problems associated to the safety of the personnel and the productivity of the current manual and/or mechanical process are eliminated.

9 Claims, 2 Drawing Sheets

U.S. PATENT DOCUMENTS

Figure 1:
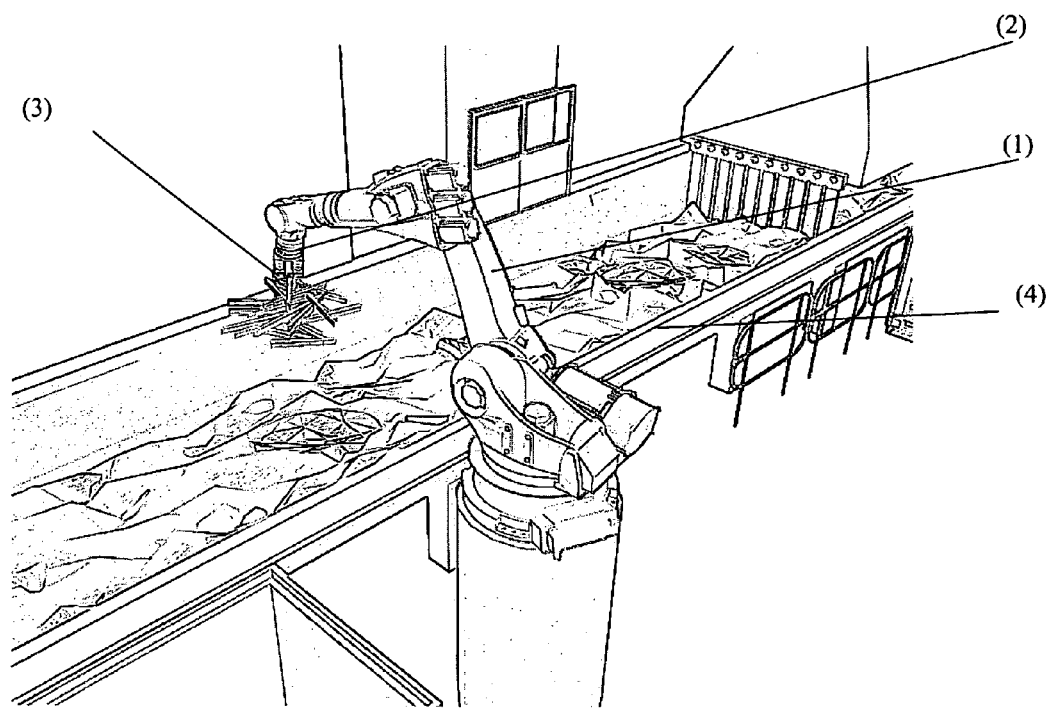

| | | | |
|---|---|---|---|
| 5,428,285 | A | 6/1995 | Koyama et al. |
| 5,460,478 | A | 10/1995 | Akimoto et al. |
| 5,567,285 | A | 10/1996 | Stiges Menendez et al. |
| 5,761,960 | A * | 6/1998 | Nagai et al. .............. 74/89.33 |
| 5,789,890 | A | 8/1998 | Genov et al. |
| 6,037,733 | A | 3/2000 | Genov et al. |
| 6,601,468 | B2 | 8/2003 | Grover et al. |
| 6,689,257 | B2 | 2/2004 | Mishima et al. |
| 6,913,650 | B2 | 7/2005 | Gilmore et al. |
| 7,033,464 | B2 | 4/2006 | Emesh et al. |
| 7,039,499 | B1 | 5/2006 | Nasr et al. |
| 7,260,450 | B2 | 8/2007 | Okazaki et al. |
| 2003/0000645 | A1 | 1/2003 | Dornfest |
| 2003/0229420 | A1 | 12/2003 | Buckingham et al. |
| 2004/0000488 | A1 | 1/2004 | Yan |
| 2004/0016637 | A1 | 1/2004 | Yang et al. |
| 2004/0022940 | A1 | 2/2004 | Nagai et al. |
| 2004/0037689 | A1 * | 2/2004 | Watanabe et al. .............. 414/730 |
| 2004/0103740 | A1 | 6/2004 | Townsend et al. |
| 2004/0186624 | A1 * | 9/2004 | Oda et al. ................ 700/245 |
| 2004/0191026 | A1 | 9/2004 | Raitanen et al. |
| 2004/0206307 | A1 | 10/2004 | Boroson et al. |
| 2004/0251866 | A1 | 12/2004 | Gan et al. |
| 2004/0254677 | A1 | 12/2004 | Brogardh et al. |
| 2005/0155865 | A1 | 7/2005 | Mishima et al. |
| 2006/0177922 | A1 | 8/2006 | Shamah et al. |
| 2007/0125657 | A1 | 6/2007 | Sun et al. |

OTHER PUBLICATIONS

Greer (IEEE), Selection Criteria for Sag Mill Drive Systems, pp. 901-908, 1990, U.S.A.

Metso Minerals (Internet), Autogenous/Semi-autogenous Mills, pp. 1-2, 2002, U.S.A.

Metson Minerals (Internet), Metso Capital Markets Day, pp. 1-31, 2004, U.S.A.

Lepka, Jaroslav; Stekl, Petr, 3-Phase AC Induction Motor Vector Control Using a 56F80x, 56F8100 or 56F8300 Device-Design of Motor Control Application, pp. Rev. 2, Feb. 2005, Freescale Semiconductor, Inc., U.S.A.

Spencer et al., (IEEE), Acoustic Emissions Monitoring of Sag Mill Performance, pp. 939-946, 1999.

Sheble, ISA, Mining's New Age, Internet, pp. 1-4, 2001.

CSIRO, (Internet) QCAT Annual Report—Queensland Center for Advanced Technologies, pp. 1-36, Jun. 2005, U.S.A.

Agnico-Eagle Mines Ltd., Variable Speed Control of SAG Mill in the Mining Industry, MInternet, pp. 1-2, 2004.

* cited by examiner

ROBOT SYSTEM AND METHOD FOR REMOVING STICKS AND/OR FOREIGN ELEMENTS FROM CONVEYOR BELTS

CROSS-REFERENCE TO RELATED APPLICATIONS

This application claims the benefit of provisional patent application Ser. No. 60/734,974 filed 2005 Nov. 10 by the present inventor

FEDERAL SPONSORED RESEARCH

Not Applicable

SEQUENCE LISTING OR PROGRAM

Not Applicable

BACKGROUND

1. Field of Invention

This invention relates to the use of robotic technology in mining industry, specifically in material transport through conveyor belts

BACKGROUND

2. Prior Art

The extractive mining is the science of extracting the metals or other products with metallic content from the mines. In other words, it is the way in which the mineral is retrieved from the ore deposit, treated inside the mine and how is transported to the plant.

According to the exploitation method, there are 2 types. The first one called open pit exploitation which is a set of operations needed to extract the rock or the mineral with economic value, through the retrieval of the mineral recovering in a partial or complete way from the surface. This type of exploitation is used when the mineralized body is over or near the surface.

The second method is called underground exploitation. Access tunnels are built to reach the mineralized belt. The rock retrieval is performed through the use of explosives. The mineral is removed taking advantage of the weight of the mineral itself. In general this type of exploitation could be separated into three groups:

Rooms and pillars: the mineral is removed and empty rooms are being generated inside the hill, where mining pillars are installed. Once the mineral is treated the room is filled with sterile material to avoid the hill from collapsing.

Block caving: This method consists of preparing a block through different levels. The block is weakened on its base by digging tunnels through it so it is solely supported by the pillars being formed in different rooms.

Sub Level Caving: This is a high cost method based on the principle described above, in which parallel production rooms are prepared every 11 meters in the horizontal and 11 meters in the vertical so as to cover the mineralized body to be exploited.

The mineral is extracted with a very uneven shape from the mine, and its reduction is needed for evenness. This is carried out in different stages such as crushing and grinding depending on the reduction size required.

During the crushing process the size reduction of the mine layers is produced to the required size according to the hydrometallurgical point to be used. Generally, there are three crushing stages are passed where the mineral is reduced to 4" to 8" and finally ¼" a ⅜" to be sent to the fine heap pile.

The grinding process is one of the simplest current method for mineral comminution and with other supplementary stages to obtain in a selective and pure way the copper product. This stage is intended to reduce the size of the incoming mineral to produce fines leaving it under certain conditions for a new process. This operation could be carried out under dry or wet conditions.

Nevertheless, during the grinding and crushing processes, elements which are dragged by the material are detected on the conveyor belts. Such elements usually are sticks or wood residues, which were used in underground exploitation.

At present, the task of removing such sticks from the conveyor belts is carried out manually and/or mechanically which has some disadvantages such as:

Decrease in productivity due to the fact that the conveyor belt is stopped during the removal of the foreign elements.

Costs associated to the personnel involving the manual and/or mechanical removal.

The manual removal of the sticks from the conveyor belt is an activity which has a high accident rate risk.

The operators in charge of the manual reposition are subjected to a constant physical demand in harsh environmental conditions.

SUMMARY

A robotic system and method have been developed for the automated removal of sticks and/or foreign elements from conveyor belts. The robotic arm uses the gripping mechanism to remove the sticks from a conveyor belt and moves them to a container.

DRAWINGS—FIGURES

Figure 2:
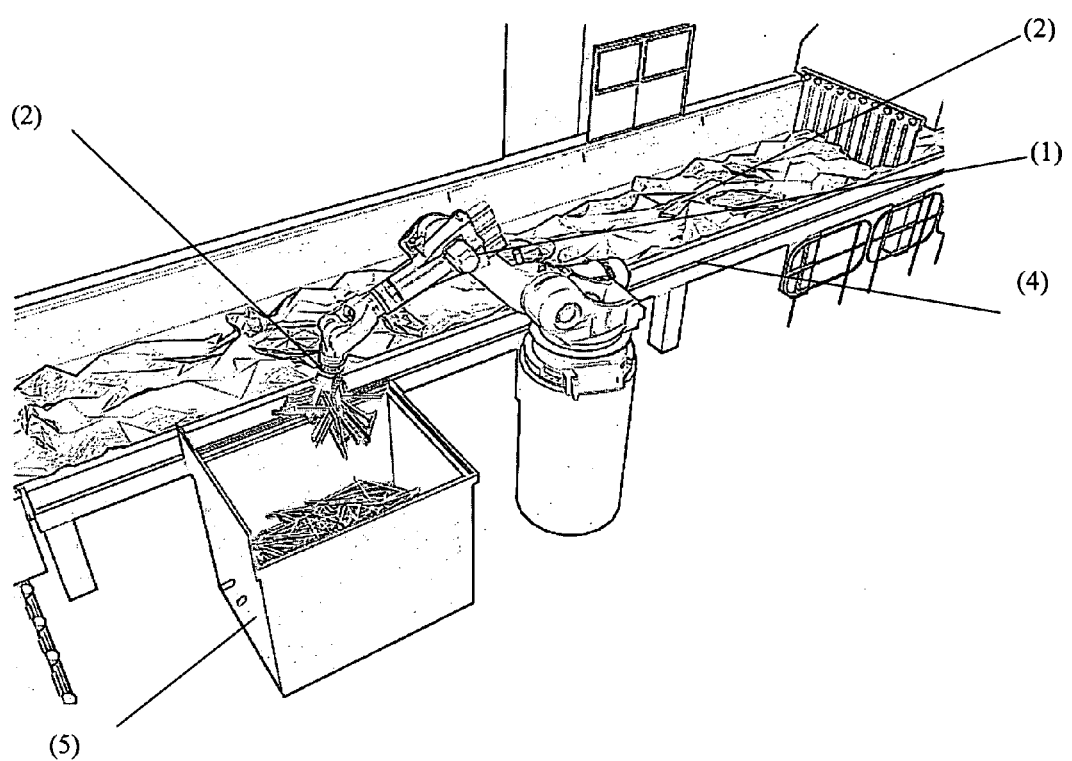

FIG. 1. General view of a robot system removing sticks and/or foreign elements from the conveyor belts FIG. 2. General view of a robot system removing sticks and/or foreign elements from the conveyor belts

DRAWINGS—REFERENCE NUMERALS

1. Robotic manipulator
2. Gripping mechanism
3. Sticks
4. Conveyor belt
5. Container

DETAILED DESCRIPTION

This invention relates to a new robot system as well as a robotic method for the removal of sticks and/or foreign elements from conveyor belts, which is carried out automatically through anthropomorphous robotic arms of at least 5 degrees of freedom, which are installed at one side of the conveyor belt under concern.

With reference to FIG. No. 1 and 2, the robot system for the removal of conveyor belts is composed mainly of one robotic manipulator of at least 5 degrees of freedom (1), provided with a communication, acquisition and control system, and a gripping mechanism (2) to allow to take the sticks (3) from the conveyor belt (4) and deposit them at one side in a container (5). The system additionally has a vision system which is provided with cameras and one logic processing unit as support to the robotic system.

I claim:

1. A method for removing sticks and other items from a moving conveyor belt using a robot, comprising the steps of:
   said robot visually detecting and distinguishing sticks and other items for selection for removal from other elements on a moving conveyor belt, including identifying the shape, the position, and the orientation of the items for selection,
   selecting a group of sticks or other items for removal,
   gripping the selected group of sticks or other items for removal,
   raising the selected group of sticks or other items for removal off of the moving conveyor belt,
   manipulating the selected group of sticks or other items for removal away from said moving conveyor belt, and
   releasing the selected group of sticks or other items for removal into a container;
   wherein said robot includes an anthropomorphous robotic arm of at least 5 degrees of freedom provided with a gripping mechanism and fingers; a vision or detection system with at least one camera for capturing images of items moving on a conveyor belt; a logic processing unit for processing images captured by said camera to recognize objects on said conveyor belt and their orientation, shape, and position and thereby determining which objects to select for removal; a control, communication and programming unit for remote communications and control of the robotic arm; and an electric supply system.

2. The method of claim 1, wherein said robot has the capability to move and manipulate objects in different paths.

3. The method of claim 1, wherein said robotic arm communicates directly or through a programmed logic controller interface with the control, communication and programming unit.

4. The method of claim 1, wherein said robot is capable of obtaining and interpreting information from installed analogue or digital sensors.

5. The method of claim 1, wherein said robot has the capability to generate analogue or digital signals to control analogue or digital inputs devices.

6. The method of claim 1, wherein said gripping mechanism includes at least 2 fingers.

7. The method of claim 1, wherein productivity and efficiency in the removal process increases.

8. The method of claim 1, wherein said robot may operate automatically or semi-automatically, and also is scalable.

9. The method of claim 1, wherein said method is integrated in different stages of an extracting process including at least one of crushing, grinding, smelting, and roasting different metals of interest including at least one of copper, iron, nickel, silver, gold, tin, and lead.

* * * * *